United States Patent [19]
Singhal

[11] Patent Number: 5,251,478
[45] Date of Patent: Oct. 12, 1993

[54] DEVICES AND MEANS TO SUSPEND SCALED FLYING CRAFTS DURING TEST AND TRAINING FLIGHTS

[76] Inventor: Tara C. Singhal, P.O. Box 5075, Torrance, Calif. 90510

[21] Appl. No.: 924,498

[22] Filed: Aug. 4, 1992

Related U.S. Application Data

[63] Continuation-in-part of Ser. No. 707,593, May 30, 1991, abandoned.

[51] Int. Cl.⁵ ............................................. G01M 9/00
[52] U.S. Cl. ........................................ 73/147; 244/1 R
[58] Field of Search .................. 244/1 R, 53 R, 58, 55, 244/49, 63; 342/34, 54; 212/152; 250/221, 221.1; 73/147, 148

[56] References Cited

U.S. PATENT DOCUMENTS 2,799,460  7/1951  Hastings ................................. 73/147
4,457,509  7/1984  St. Germain ........................... 73/147
4,920,791  5/1990  Griffin .................................... 73/147

OTHER PUBLICATIONS

Lovell et al., "Hovering-Flight Tests of A Model of A Transport" NACA TN 3630, Mar. 1956.
"The Industrial Application of Aerody. Tech", National Physics Lab. Notes on Applied Sci 1952, No. 2.

Primary Examiner—Galen Barefoot

[57] ABSTRACT

Devices and means to suspend scaled flying crafts during test and training flights, in a controlled environment space with a cable/string from a high point in the space, consisting of an electrical slack sensor on the cable/string and a radio controlled electrical system to automatically adjust the slack in the cable/string with the help of an electrically driven winch, permitting the flying craft to fly safely and freely under its own power.

5 Claims, 3 Drawing Sheets

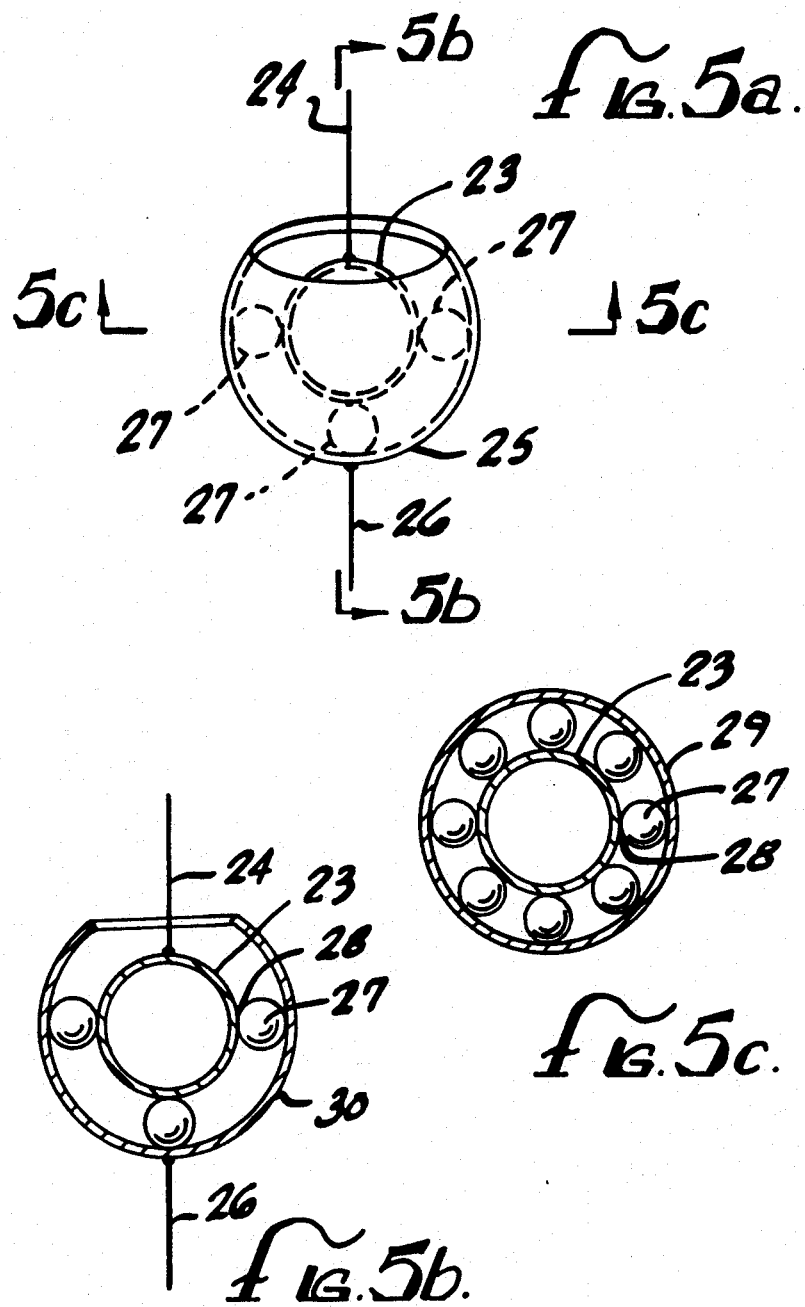

DEVICES AND MEANS TO SUSPEND SCALED FLYING CRAFTS DURING TEST AND TRAINING FLIGHTS

CROSS REFERENCE

This application is a continuation in part of Ser. No. 07/707,593 filed May 30, 1991, now abandoned.

BACKGROUND OF INVENTION

1. Field of Invention

Flying crafts such as hovering crafts, helicopters and other flying craft's scaled models are tested to study their flying qualities and control characteristics. A controlled environment space for their flight which enables them to be tethered to a safety cable/string without such cable/string affecting their free flight is a useful device. No such device exists except by an operator physically holding a cable/string tied to the flying craft and controlling the same by visually observing the flight of the craft. This means requires an operator and his ability to quickly pull or let loose the cable/string as the flying craft moves around and up and down in its flight. Other means also exist for tooting helicopters, which consist of a ground based stand with movable fan fold extendable arms which extend in and out and rise up or down as the helicopters strapped to the arm maneuvers in flight. Helicopter's area of movement is restricted by the size of arm and the area covered by a circle with a radius corresponding to the length of the arm. This invention provides another and a superior method to suspend flying crafts giving them a larger volume of space for their flight and a freer flight during test and training flights.

2. Description of Prior Art

National Advisory Committee for Aeronautics, Technical Note 3630, March, 1956, FIG. 2, Indoor test setup used in the flight testing of hovering models.

SUMMARY OF INVENTION

Devices and means to suspend scaled flying crafts during test and training flights, in a controlled environment space with a cable/string from a high point in the space, consisting of an electrical slack sensor on the cable/string and a radio controlled electrical system to automatically adjust the slack in the cable/string with the help of an electrically driven winch, permitting the flying craft to fly safely and freely under its own power.

BRIEF DESCRIPTION OF DRAWINGS

FIGS. 5A, 5B, 5C. A cable/string to flying craft tether means allowing craft to freely rotate without at the same time winding up the cable/string.

DESCRIPTION OF PREFERRED EMBODIMENT

Figure 1:
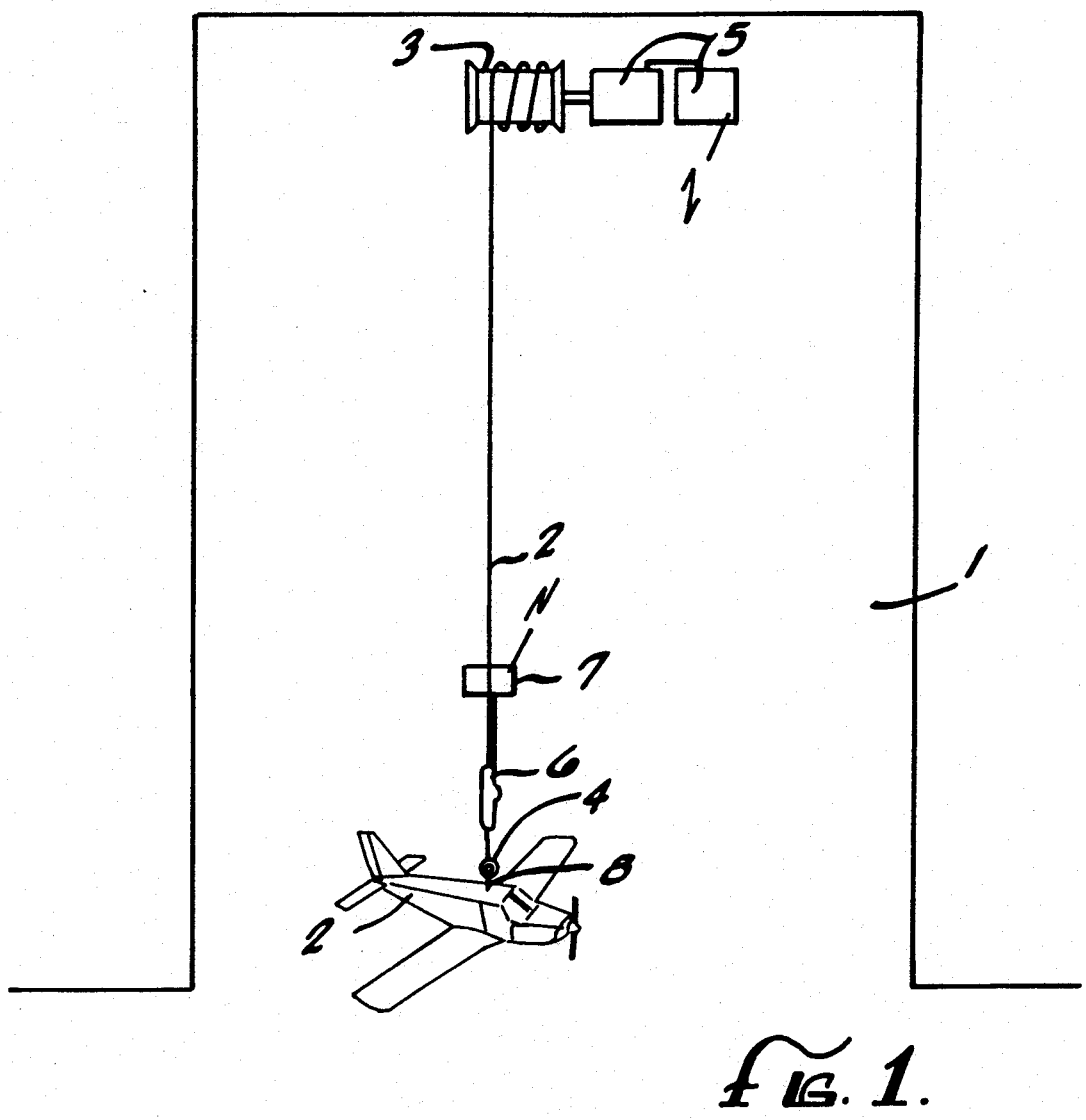
FIG. 1. Flying craft suspended from the high point with a cable/string equipped with a device to automatically detect and then automatically adjust the slack in the cable/string from which the flying craft is suspended.
Figure 2:
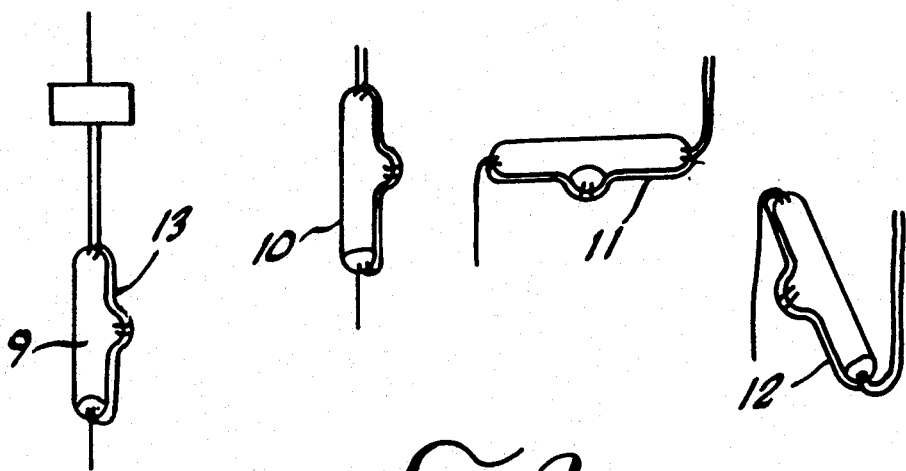
FIG. 2. The electrical slack sensor that automatically detects slack in the cable/string.
Figure 3:
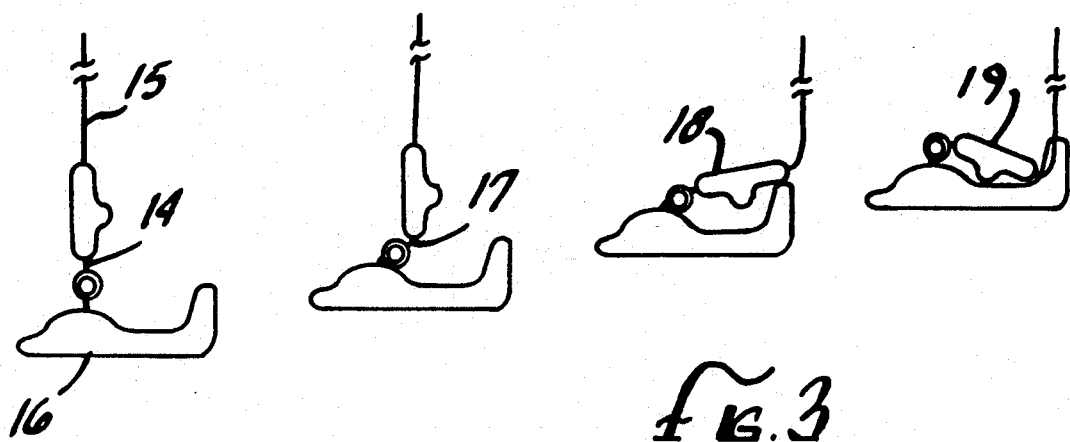
FIG. 3. How the electrical slack sensor operates as the flying craft moves up or down in its flight.
Figure 4:
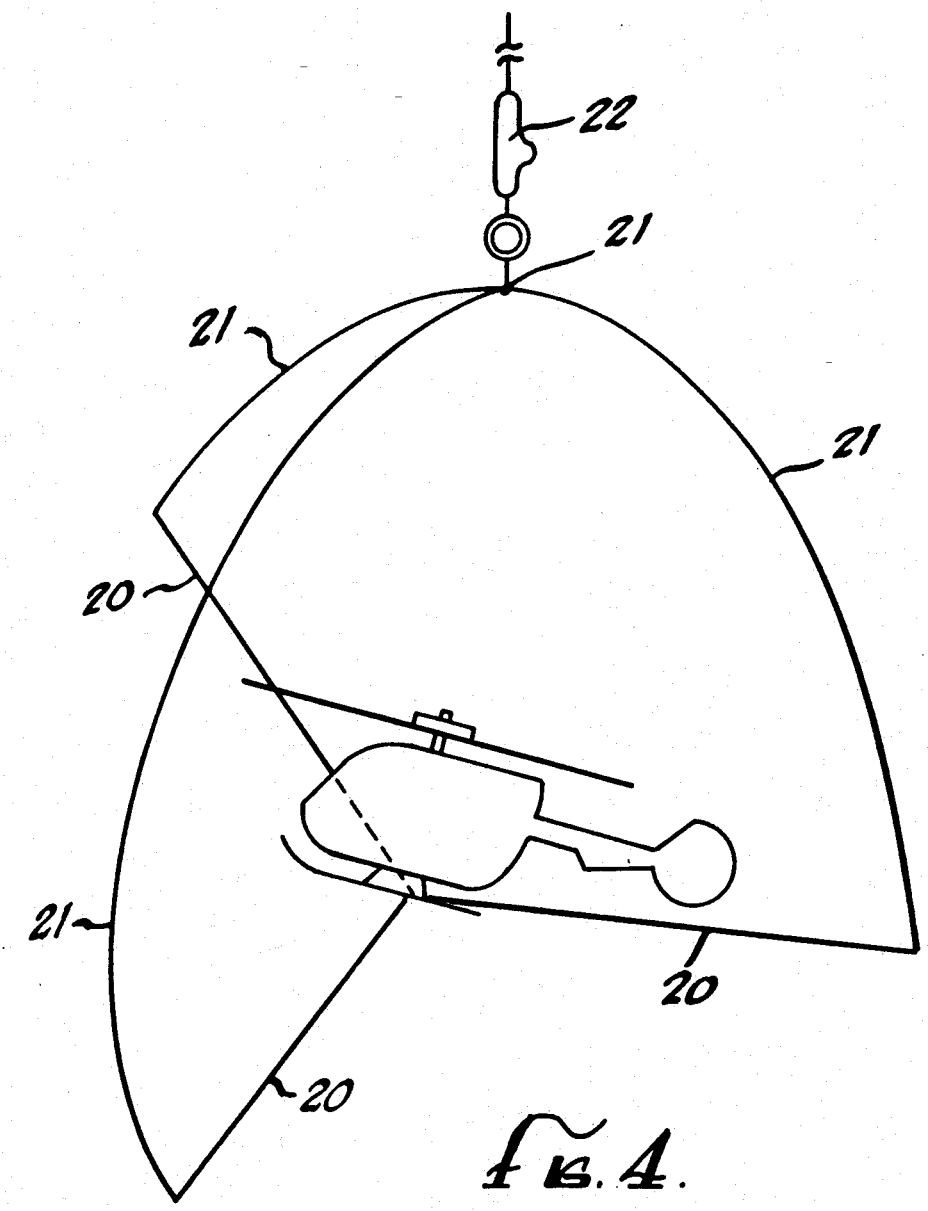
FIG. 4. A light weight rigid frame for use on flying crafts for which no suitable tether point is available on top of the craft.

Flying crafts such as hovering crafts, helicopters and other flying craft's scaled models are tested to study their flying qualities and control characteristics. A controlled environment space for their flight which enables them to be tethered to a safety cable/string without such cable/string affecting their free flight is a useful device. No such device exists except by an operator physically holding a cable/string tied to the flying craft and controlling the same by visually observing the flight of the craft. This means requires an operator and his ability to quickly pull or let loose the cable/string as the flying craft moves around and up and down in its flight. Other means also exist for testing helicopter, which consist of a ground based stand with movable fan fold extendable arms which extend in and out and rise up or down as the helicopter strapped to the arm maneuvers in flight. Helicopter's area of movement is restricted by the size of arm and the area covered by a circle with a radius corresponding to the length of the arm. This invention provides another and a superior method to suspend flying crafts giving them a larger volume of space for their flight and a freer flight daring test and training flights.

REFERENCE FIG. 1

A controlled environment space in the form of a building or other suitable structure is used for test and training flights of the flying crafts.(1) The flying craft is suspended with a thin light weight cable/string from a high point in the space.(2) The total length of the cable/string is such that at its full extension or deployment, the flying craft is protected from impacting or crashing into the floor or the surroundings of the space. The cable/string is wound on a winch attached to the high point, such that winding the winch in different direction would lower or raise the cable/string end and the flying craft attached to it.(3)

The cable/string end attachment to the craft is attached by means of a spherical ball bearing mechanism such that it would allow the craft to freely rotate without winding up the cable/string itself. (4)

The winding of the winch is controlled by an electrical motor, which itself is activated by commands received by a radio receiver attached to the motor.(5)

The string from which the flying craft is hung is equipped with an electrical slack sensor that senses the slack of the cable/string at a point of the cable/string close to where it is attached to the flying craft. (6)

When the slack sensor detects too much or too little slack, it conveys its output to an electrical circuit consisting of a radio transmitter and the radio receiver. The transmitter radiates forward or reverse commands to the radio receiver which drives the electrical motor connected to the winch at the high point. When the slack sensor detects correct amount of slack, No command or Stop command is radiated by the transmitter. The electrical motor is connected to the winch which pulls the cable/string end and therefore the hanging flying craft up or down.(5)

The radio transmitter is hung from the same cable/string approximately a few feet above from where the electrical slack sensor is connected.(7) This does not affect the modal flying craft in its flight.

This enables the flying craft to move up or down in the controlled environment space with the qualities of a very near free flying craft even though it is tethered to this cable/string from central location on top of the flying craft.(8)

REFERENCE FIG. 2

The electrical slack sensor consists of a thin/slender hollow glass/other suitable material tube with an elbow bent in the middle, and containing small amount of mercury and electrical contacts so that the when the position of the tube changes, the mercury makes contact with different electrical contacts. (9)

If the tube is in nearly vertical position, the mercury remains at the bottom, indicating that the tube position is vertical and that there is no slack in the cable/string.(10) If the tube is in nearly horizontal position, that is up to 45 degrees on either side of the horizontal, the mercury settles in the elbow bent in the center of the tube indicating that there is the right amount of slack.(11) If the tube is in nearly upside down vertical position, mercury settles at the top end of the tube, indicating that there is too much slack in the cable/string from which the tube is connected.(12)

The glass tube has electrical contacts inside it at three locations that are connected to wires which are carried to a few feet above the electrical slack sensor along the cable/string and connected to a radio transmitter.(13)

Thus, this device just described acts as a electrical slack sensor to keep the slack in the cable/string from which the flying craft is hanging just right to make the flying craft free flying.

REFERENCE FIG. 3

The electrical slack sensor is attached at the lower end with a very short, few inches, of cable/string to the spherical ball bearing which then is tied to the top of the flying craft.(14) The sensor from the upper and is attached to a long cable/string which is connected to a winch at the high point.(15) Therefore when the flying craft is hanging straight down under its own weight without being flown, both the cables/strings, the short one and the long one are tight and the sensor is in vertical straight position. (16) When the craft is lifted up a little, less than the length of the short string, either by hand or when flying under its own power, then the short string will assume nearly horizontal position resembling a stretched out horizontal S shape.(17) If the craft is further lifted up then it will partially be touching and lifting the weight of the glass tube itself.(18) If the craft is further lifted up the glass tube will tilt further assuming inverted vertical position, then the tube will be fully touching the craft and the weight of the tube will be wholly supported by the craft.(19) Therefore the glass tube assumes different positions or rotates when the craft lifts up varying amounts from its fully hung position. A craft flying under its own power would lift up rotating the glass tube as indicated above. The rotating glass tube will cause the mercury to settle in one of three positions and cause forward/reverse/stop commands to be issued to the winch via the electrical slack sensor and the electrical circuit.

REFERENCE FIG. 4

For flying crafts that do not have an accessible location on the top for hooking to cable/string, a light weight rigid frame is attached at the bottom or other accessible part of it. Horizontal members of the frame extend to both sides of the craft.(20) Then other members, possibly two or three, go up and around encircling the craft away from the moving parts to a common point on the top.(21) At that point on the top of the frame is attached the cable/string with a electrical slack sensor connected to the cable/string and the winch motor. The cable/string is lowered or raised based on slack detected by its electrical slack sensor.(22)

REFER TO FIG. 5

The spherical ball bearing mechanism consists of an internal sphere.(23) It is connected at one end to the cable/string.(24) An outer larger hollow sphere with a circular opening at one end encloses the internal sphere with the circular opening accommodating the cable/string attached to the internal sphere.(25) Another cable/string is connected to the other end of the hollow sphere directly opposite the opening.(26) The two spheres are separated by a space occupied with small spherical balls and touching them, providing a freely moving spherical ball bearing mechanism.(27) The small spherical balls rest in multiple shallow uniform depressions either on the outside surface of the internal spherical ball or on the inside surface of the outer hollow sphere.(28) The outer hollow sphere is thus free to rotate and ride the spherical balls, in relation to the internal sphere. A cross section across lines X—X of FIG. 5 (29) and cross section across Y—Y of FIG. 5 (30) shows the arrangement of the small balls in the mechanism.

This mechanism will let one cable/string and rotate independently and freely from the cable/string at the other end of this spherical ball bearing mechanism even when the axes of the two cables are not perfectly aligned to each other in a straight line.

Therefore I claim:

1. A device to suspend a scaled flying craft during test and training flights in a controlled environment space comprising:
   (a) a flying craft tethered from a central location on top of the flying craft by one end of a tether, the other end of the tether connected to a high point in the controlled environment space;
   (b) the connection at said high point comprises of a winch driven by an electrical motor to lower or raise the flying craft;
   (c) said tether is equipped with an electrical slack sensor to measure slack of the tether;
   (d) said electrical slack sensor generating an electrical output indicating slack in said tether;
   (e) said electrical output connected to an electrical circuit;
   (f) said electrical circuit controlling said electrical motor;
   (g) said electrical motor driving said winch;
   wherein said electrical output via said electrical circuit driving said electrical motor in forward, reverse, and stop modes to maintain a predetermined slack in the tether, so that the predetermined slack allows said flying craft to freely move about in said controlled environment space under its own power.

2. The device of claim 1, wherein the electrical slack sensor comprises:
   (a) a tube having closed ends and with an elbow bent in the middle;
   (b) a small amount of mercury enclosed in the tube;
   (c) the tube is such that at any one time the mercury settles in the elbow bent in the middle, or in one of the two ends of the tube;

(d) the elbow bent is of the size and shape that the mercury remains settled in it if the tube is held horizontally or at an angle up to nearly 45 degrees from the horizontal on either side;
(e) electrical contacts inside the tube at the two ends and at the middle elbow of the tube;
(f) said electrical contacts connected to said electrical circuit by wires.

3. The device of claim 1, wherein the electrical circuit comprises:
(a) said electrical output connected by thin wires to a radio transmitter;
(b) said transmitter attached to said tether a few feet above from where said electrical slack sensor is attached;
(c) said transmitter sending forward, reverse, and stop mode commands to a radio receiver;
(d) said radio receiver mounted proximate to and electrically connected to said electrical motor;
(e) said radio receiver receiving said mode commands and sending control commands to said electrical motor;
(f) said electrical motor connected to said winch.

4. The device of claim 1, wherein said tether is connected to said flying craft by a lightweight rigid frame attached to a point at the bottom of said flying craft and suspended by the tether, said frame comprising:
(a) long members with attachment means at one end of the members;
(b) said long members being held in a substantially horizontal position and said attachment means attached to the flying craft at the bottom of the craft;
(c) at the other end of said long members, additional long members attached thereto, the additional long members extending upward and encircling the flying craft until they join together at the top to form a substantially triangular shape;
(d) said top attached to the tether and its electrical slack sensor.

5. The device of claim 1, wherein the tether is connected to said flying craft by a connector comprising:
(a) a spherical ball bearing mechanism;
(b) said mechanism consisting of an internal sphere connected at one end to the tether;
(c) said internal sphere having multiple shallow uniform depressions on its outside surface;
(d) said shallow uniform depressions having small spherical balls positioned in them;
(e) an outer hollow sphere with a circular opening at one end enclosing the internal sphere along with the small spherical balls and touching them, providing a freely moving spherical ball bearing, with the opening accommodating the tether attached to the internal sphere;
(f) another tether connected to the other end of the said outer hollow sphere directly opposite the opening.

* * * * *